May 22, 1928.

L. F. CLERC 1,670,494

AUTOMOBILE HEATER

Filed May 2, 1925

Inventor

Leonard F. Clerc,

By

Attorney

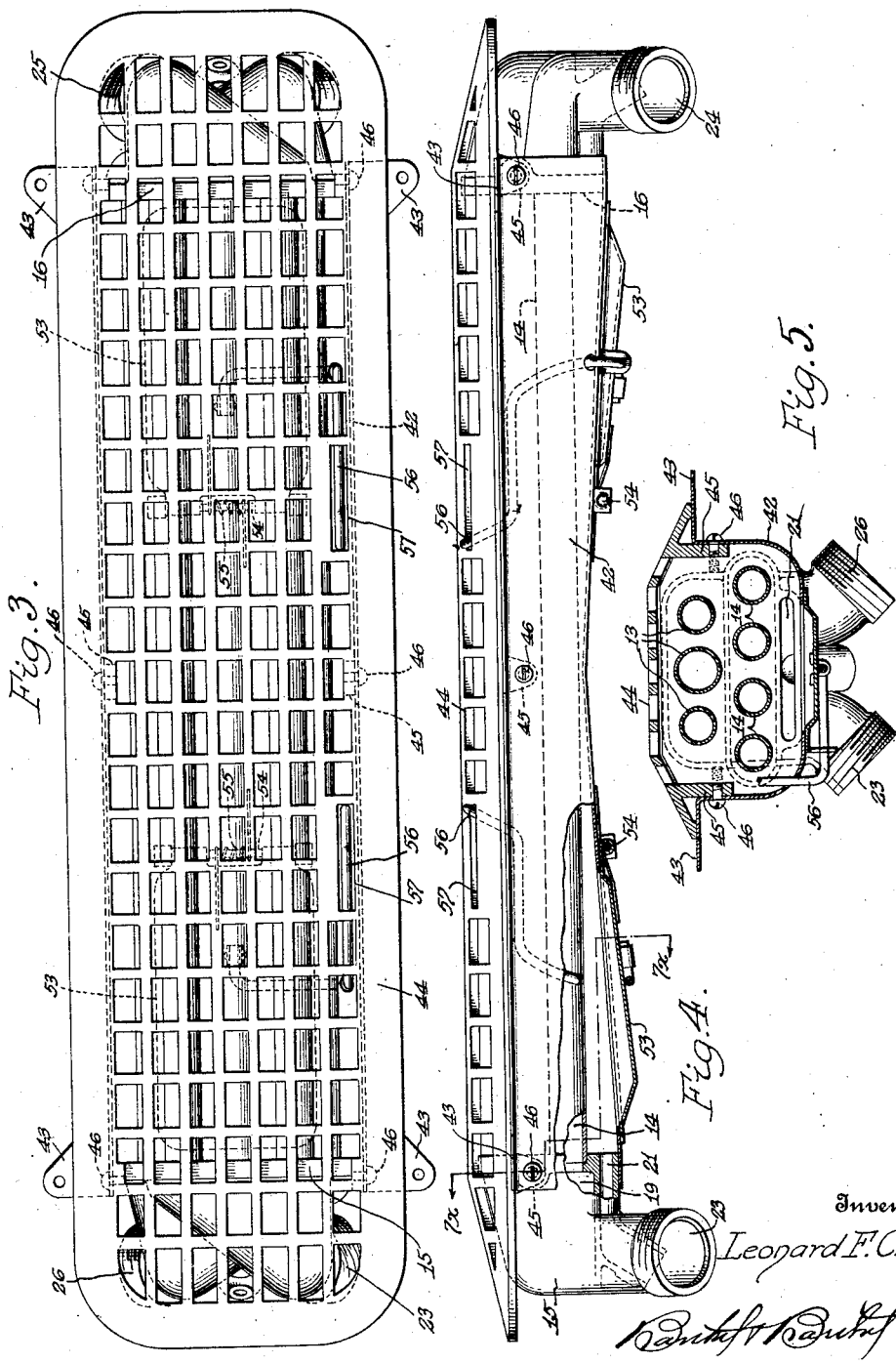

May 22, 1928.
L. F. CLERC
1,670,494
AUTOMOBILE HEATER
Filed May 2, 1925   3 Sheets-Sheet 3
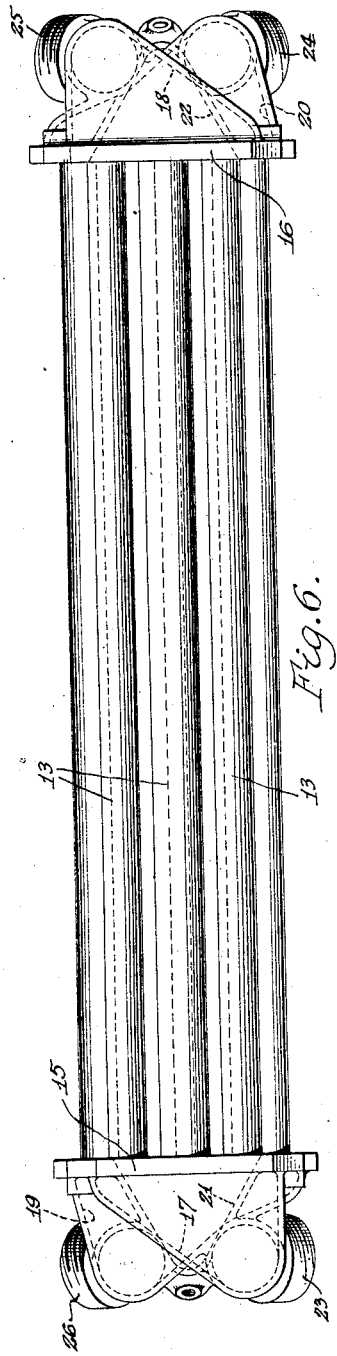
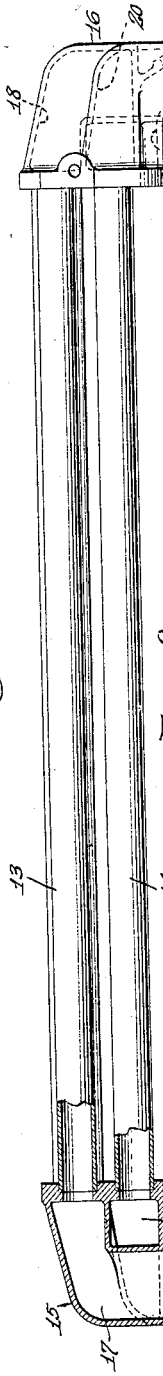
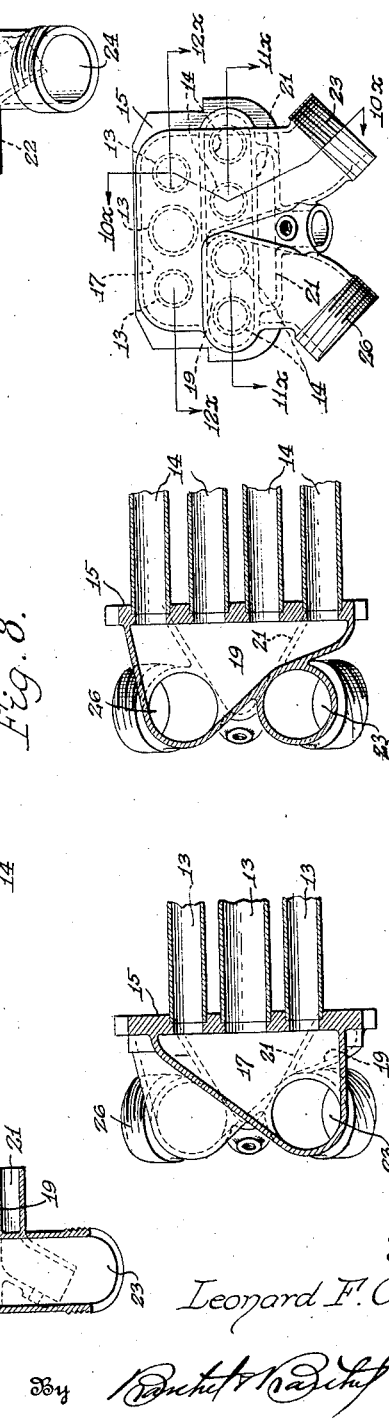
Inventor
Leonard F. Clerc,
By
Attorneys Patented May 22, 1928.

1,670,494

UNITED STATES PATENT OFFICE.

LEONARD F. CLERC, OF DETROIT, MICHIGAN.

AUTOMOBILE HEATER.

Application filed May 2, 1925. Serial No. 27,423.

This invention relates to means for the heating of motor vehicles by utilizing the heat of exhaust gases, and has for its object to provide a radiator equipment or installation for such motor vehicles wherein especial provision is made for the control and circulation of exhaust gases therethrough, so that the heating of the interior of the vehicle to which the equipment is applied may be effected and regulated in a manner greatly adding to the comfort of passengers therein in cold weather.

Still further objects subsidiary to or resulting from the aforesaid object or from the construction or operation of the invention as it may be carried into effect, will become apparent as the said invention is hereinafter further disclosed.

In carrying the said invention into effect, I may provide in connection with or as an attachment to a motor vehicle having, say, two exhaust pipes, one on each side of the vehicle, a radiator adapted for suitable disposition in the vehicle and having two sets of transversely arranged heat radiating pipes, one set being connected at one end to the adjacent exhaust pipe and the other at the opposite end to the other exhaust pipe, the ends of the said sets of pipes not so connected having further exhaust pipes leading therefrom independent of the first mentioned exhaust pipes and provided with independent mufflers. Valve means are adapted to shut off the radiator and thereby permit free passage of the gases through the muffler of the main exhaust pipes in the ordinary manner, or to be operated to entirely shut off the passage to said mufflers and direct all of the exhaust gases through said radiator and said independent mufflers; or by intermediate adjustment of the valve mechanism, permit partial passage of the exhaust gases through the radiator and through the main exhaust pipes.

The radiator is preferably housed in a suitable casing, provided with air inlet passages so that air may circulate around the said radiating surfaces of the radiator.

All of which is more particularly described and ascertained hereinafter, by way of example, having reference to the accompanying drawings, wherein—

Figure 3 is a plan view of the radiator proper incorporated in its housing;

Figure 4 is an elevation of the same partly broken away;

Figure 5 is a transverse section of the same taken on the line $7^x$—$7^x$, Figure 4;

Figure 6 is a plan view of the radiator proper removed from its casing;

Figure 7 is an end elevation of the same;

Figure 8 is an elevation of the same partly broken away and in section taken on the line $10^x$—$10^x$, Figure 7;

Figure 9 is a fragmentary horizontal section taken on the line $11^x$—$11^x$, Figure 7;

Figure 10 is a fragmentary horizontal section taken on the line $12^x$—$12^x$, Figure 7.

Similar characters of reference indicate similar parts in the several figures of the drawings.

Figure 1:
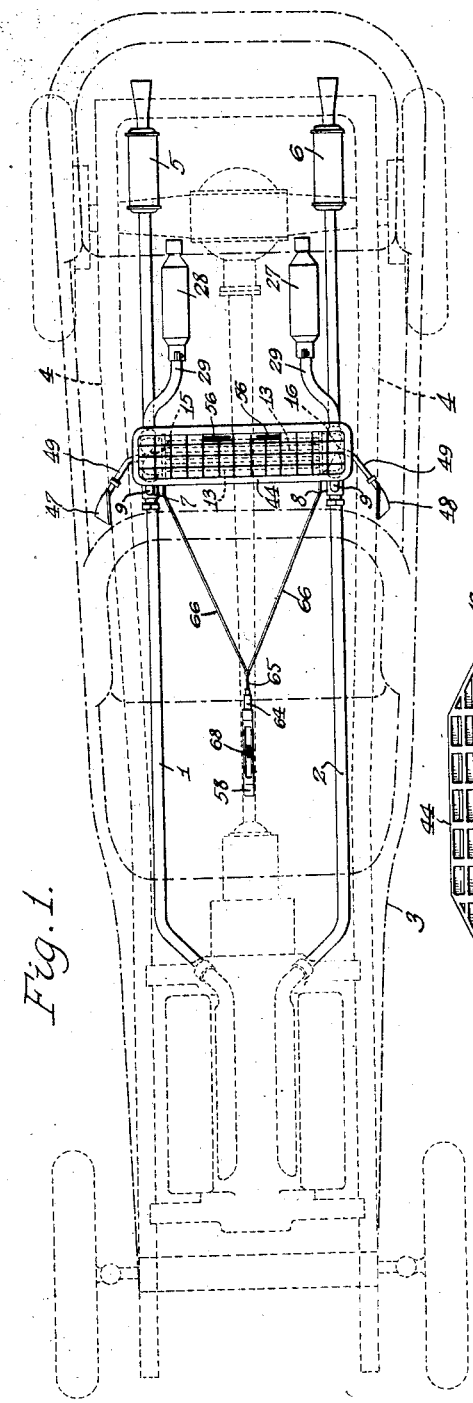
Figure 1 illustrates in plan an embodiment of the said invention in a motor vehicle, said motor vehicle being indicated in dotted lines.

Referring to Figures 1 to 10, 1 and 2 indicate exhaust pipes situated on opposite sides of a vehicle 3 and usually more or less adjacent the frame 4 of the vehicle chassis; 5 and 6 being the usual mufflers provided at the ends of the said exhaust pipes. To provide connections for the radiator about to be described, the said exhaust pipes are shown as being interrupted by T couplings 7 and 8, the upwardly extending branches 9 of which are suitably adapted to be connected to the inlet ends of the radiator hereinafter referred to. Within each of these T couplings is a valve 10 adapted when operated in the required direction to close upon a seat 11, shutting off the passage of exhaust gases against escape through the rear ends of the exhaust pipes, or to close upon a seat 12 at the base of a branch 9, shutting off the passage of exhaust gases therethrough.

It will be obvious that according to the adjustment of the valves in the T couplings the exhaust gases may be free to pass through the mufflers 5 and 6 in the ordinary way and prevented from escaping through the said branch pipes, or vice verse; or by an intermediate adjustment of the valves partial escape in both directions might be permitted.

An important feature of this invention lies in the provision of a combination of register and muffler which may be thrown into operation, completely or partly independent of the main exhausting means which includes the mufflers 5 and 6, by the operation of the valves 10. The radiator proper is shown as comprising an upper set of parallel tubes 13 and a further set of tubes 14 arranged therebeneath, the said tubes at their extremities entering hollow end castings 15 and 16 partitioned to provide upper chambers 17 and 18 respectively, and lower chambers 19 and 20 respectively. The said castings also include on their underside passages 21 and 22.

Figure 2:
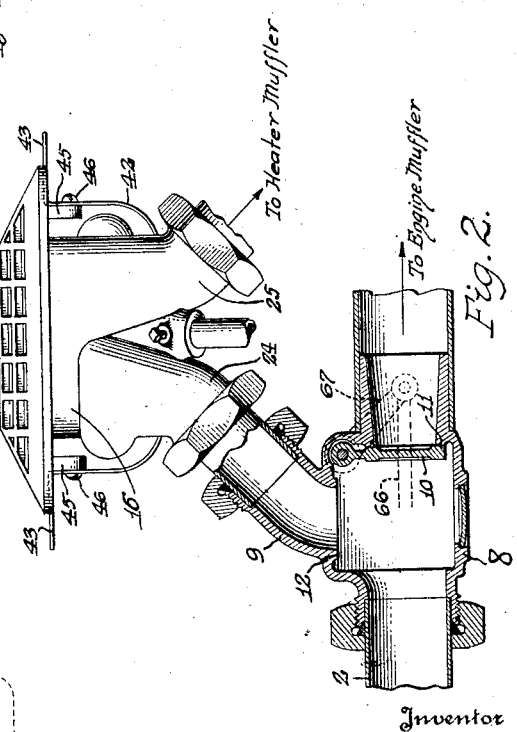
Figure 2 is a fragmentary detail view partly in section illustrating the connection of one end of the radiator to one of the exhaust pipes of the vehicle.

The chambers 17 and 18 form headers at opposite ends of the tubes 13, and the chambers 19 and 20 similarly form headers for the tubes 14; and it will be noted that the said chambers 17 and 20 are provided with downwardly and forwardly extending tubular branches 23 and 24 respectively adapted to be connected to the branches 9 of the T couplings 7 and 8 such as in the manner shown in Figure 2.

The upper chamber 17 and the lower chamber 20 of the castings 15 and 16 respectively, form the inlet headers of the upper and lower radiator tubes 13 and 14, so that by the required adjustment of the valves 10 heated exhaust gases will be passed through the upper and lower tubes in opposite directions into the chambers 18 and 19 which form the exhaust headers of the said radiator and from which outlet branches 25 and 26 rearwardly extend. To these branches 25 and 26, auxiliary mufflers 27 and 28 are connected such as by pipes 29.

As a matter of convenience, protection and for the support of the radiator in the vehicle to which it is applied, it is preferred to enclose the radiator in a suitable housing which in this case is indicated as comprising a trough-shaped casing 42 in the ends of which the aforesaid castings 15 and 16 of the radiator rest, having a cover plate 44 in the form of a register or perforated plate.

Where the radiator is so enclosed it is advisable to provide for the circulation of air through the casing in order that the radiator may effectively heat the interior of the vehicle, this being the reason for providing the passages 21 and 22 in the end castings, to which passages air receivers or ventilators 47 and 48 are connected by suitably arranged air pipes 49. The valves 10 may be operated through the medium of cranks 67, valve operating rods 66 and a foot operable member 68 carried within a floor plate 58.

The described construction of radiator proper really comprises a duplex arrangement wherein the upper tubes form a radiator associated with one of the exhaust pipes and the lower tubes another radiator associated with the other of said exhaust pipes, the headers of both radiators being incorporated in common casting. Thus it will be obvious that where only one exhaust pipe is used but one of the series of pipes may be utilized in connection therewith; or, by changing one of the headers and substituting a different form therefor, both series of pipes may be utilized with a single exhaust pipe.

The described heating installation for motor vehicles provides an arrangement well adapted to perfect the heating in an efficient manner and is of a substantial construction designed to overcome many of the objectionable features common to the ordinary exhaust heater heretofore known, particularly where no provision is made for the independednt exhausting of the gases from the heater instead of their return to the main exhaust pipe or pipes as has been the common practice.

This invention may be developed within the scope of the following claims without departing from the essential features of the said invention, and it is desired that the specification and drawing be read as merely illustrative and not in a limiting sense, except as necessitated by the prior art.

What I claim is:—

1. In a radiator of the type described, upper and lower sets of tubes, headers at opposite ends of said sets of tubes, said headers partitioned to provide upper and lower chambers with which the upper and lower sets of tubes communicate, and inlet and outlet connections to the upper and lower chambers respectively of one of said headers, and to the lower and upper chambers respectively of the other of said headers.

2. A radiator according to claim 1, wherein the connections of the two upper chambers are presented one towards the front, the other towards the rear of the radiator, and the connections of the two lower chambers are similarly presented one towards the front and the other towards the rear of the radiator.

3. An automobile radiator consisting of two rows of heater tubes, one above the other, means for directing heated gases into one end of the upper row of tubes and separate means for directing heated gases into the opposite end of the lower row of tubes, and means for directing escaping gases from said tubes.

4. A radiator according to claim 1, wherein said headers are provided with air passages therein for directing a stream of air beneath said tubes.

In testimony whereof I affix my signature.

LEONARD F. CLERC.